Sept. 30, 1952     E. H. HEYER ET AL     2,612,092

CAMERA AND MONEY CONTAINER

Filed April 27, 1950     2 SHEETS—SHEET 1

ERIC H. HYER,
EDWIN ELSTON,
INVENTORS.

BY

ATTORNEY.

Sept. 30, 1952     E. H. HEYER ET AL     2,612,092
CAMERA AND MONEY CONTAINER
Filed April 27, 1950     2 SHEETS—SHEET 2
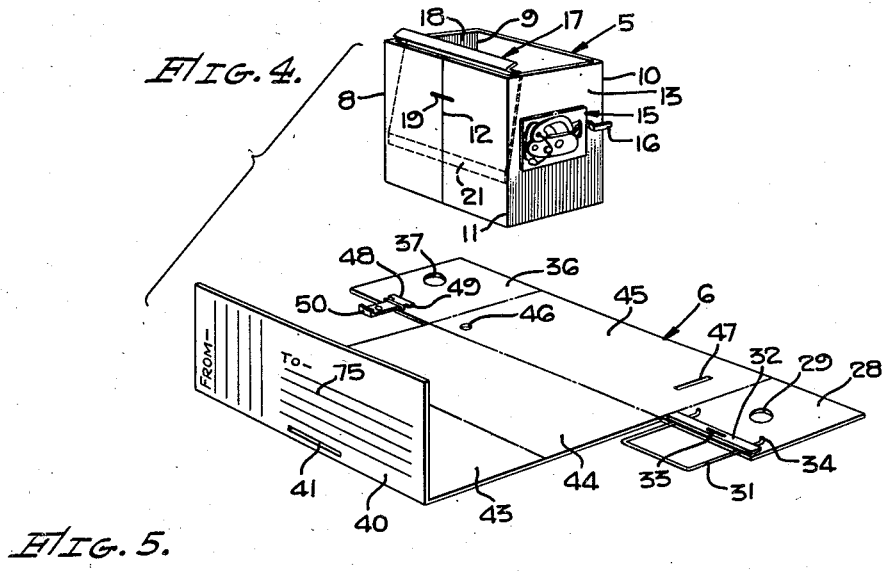
FIG. 4.
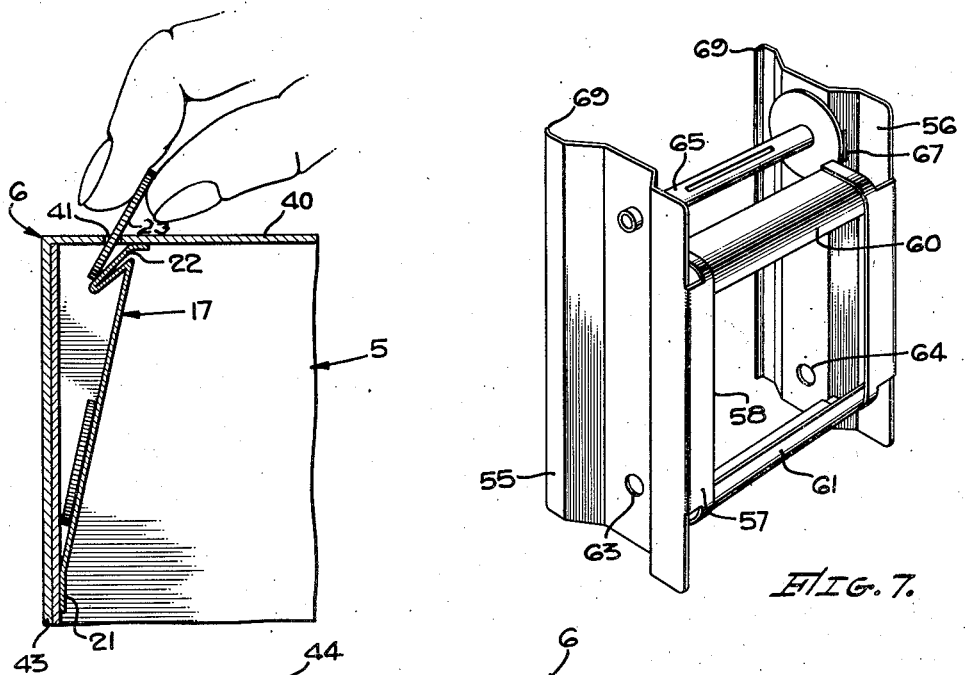
FIG. 5.
FIG. 7.
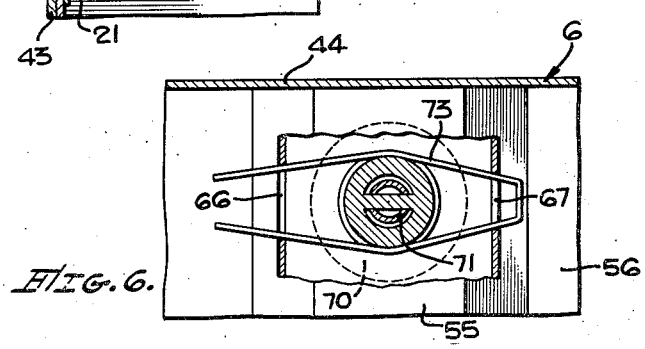
FIG. 6.
ERIC H. HYER,
EDWIN ELSTON,
INVENTORS.
BY
ATTORNEY.

Patented Sept. 30, 1952

2,612,092

UNITED STATES PATENT OFFICE 2,612,092

CAMERA AND MONEY CONTAINER

Eric H. Heyer, Los Angeles, and Edwin Elston, Beverly Hills, Calif.

Application April 27, 1950, Serial No. 158,466

4 Claims. (Cl. 95—12)

This invention relates to photographic apparatus, and particularly to a camera which not only may be used for photographing, but which is so constructed that it will serve as a money depository or container for shipment through the mails.

Cameras of the box type having universal or fixed focus lenses are well-known, the present invention being directed to a camera of this type which may be constructed economically. It is formed from a minimum of folded blanks or stamped out sheets of material, such as cardboard, which are so assembled that a strong overall structure is provided. The various units necessary for intermittently introducing light to a film, to determine the scene to be photographed, and the window through which the position of the film is indicated are simplified to utilize a minimum of parts, some of which perform more than one function. The film roll or spool holder is a unit which may be removed from the box and the film threaded therein, the holder unit being simplified to provide not only easy threading of the film, but which increases the strength of the box while holding the film flat in the focal plane.

The box is composed of two principal units, which may be stamped from material, such as cardboard, the outside unit surrounding the inside unit, one of the spaces between the units being utilized for the shutter mechanism and the other space for the film roll mechanism. To a wall or side of the inside unit, a money pocket is attached, having a flap which is both a light trap and a money trap. After the camera is used for photographing and the film roll has been exposed, the desired amount of money can be slipped into the money pocket, or container within the camera, through a slot in the outer body, and the camera, as is, sent by mail to the photo finisher. When the camera is received with sufficient money inside, a loaded camera is mailed to the sender along with the prints of the last exposed film. Even though the structure is simplified and made of material, such as cardboard, it is strong enough to withstand the rigors of transportation through the mails. The camera cannot be opened without destroying its outer wrapper.

By using a camera of this type, there is no chance of spoiling film by incorrect loading and unloading of the camera. Furthermore, since the camera is always checked by the processor when he develops the exposed film, all cameras mailed back to customers are in good working condition. The camera is always loaded with the same type of film suitable to its optics.

The principal object of the invention, therefore, is to facilitate the photographing and the obtaining of finished pictures.

Another object of the invention is to provide an economical box camera structure which has sufficient strength to be shipped through the mails as a money depository without damage thereto.

A further object of the invention is to provide a combination camera and money shipping container, whereby money may be deposited in the camera and sent through the mails.

A still further object of the invention is to provide a novel box camera structure wherein all the necessary elements are reduced to a minimum and which may be assembled rapidly and easily.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 4 is a perspective view of the two main units of the camera, one of which has been folded.

Fig. 5 is a detailed view of the money depository within the camera, taken along the line 5—5 of Fig. 2.

Fig. 6 is a detailed view of the takeup spool operating button taken along the line 6—6 of Fig. 3, and Fig. 7 is a perspective view of the film roll unit.

Figure 1:
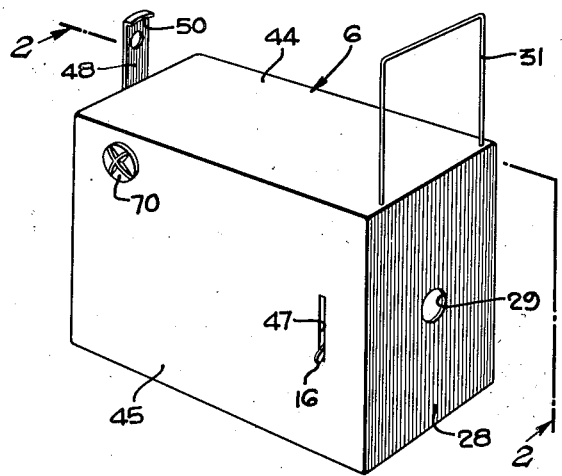
Fig. 1 is a perspective view of a camera embodying the invention.

Referring now to the drawings, in which the same numerals identify like elements, the camera unit shown in Fig. 1 comprises two main sections, such as an inner unit 5 and an outer unit 6 (see Fig. 4). The inner unit is formed from a flat strip of material, such as cardboard, which is folded along four lines, such as 8, 9, 10, and 11, the end edges abutting at 12. When the unit has been so folded, as shown in Fig. 4, the butt ends or joints may be held together either by tape or by a staple 19. The front side 13 of the unit 5 has a light opening 14 therein, in which is a universal focus lens 25 held in the wall opening 14 by tape 26 and by the back of a shutter mechanism 15 riveted to the side 13 and having an operating lever 16 extending out of the camera box. The rear wall or side 18 of the unit 5 has a rectangular aperture 20, through which the light passes to the film positioned behind it, as will be explained hereinafter.

To the side of the unit 5 held by staple 19, there is glued or suitably attached, a money pocket or compartment 17 made of a rectangular piece of material with triangular sides, such as thin cardboard, and which may be glued or stapled to the wall at the flap 21. The pocket has an upper, double flap 22 which serves as a light trap and a money trap. In normal position, the upper flat portion of the flap is flat across the money slot 41, and while money, as shown at 23, is inserted in the pocket, the outer edge of the flap maintains contact with the inner surface of the side 40 of the unit 6 to exclude light from the box. (See Fig. 5.) However, since the film will usually have been exposed and rolled up before money 23 is inserted, the chance of light striking the exposed film is small.

Figure 2:
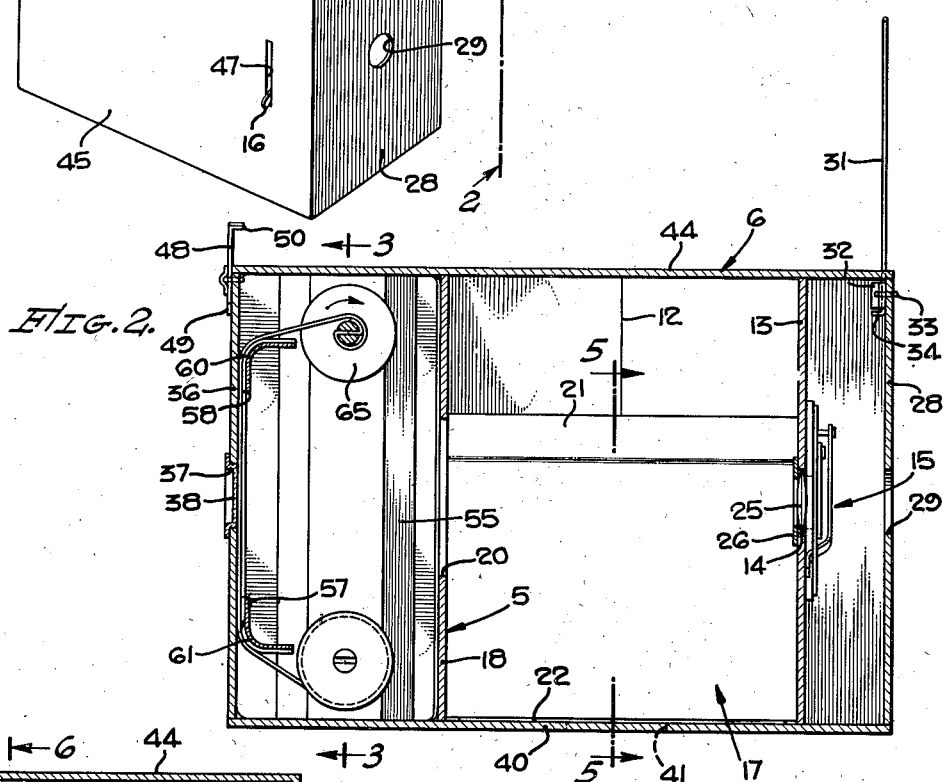
Fig. 2 is a cross-sectional view of the camera taken along the line 2—2 of Fig. 1.
Figure 3:
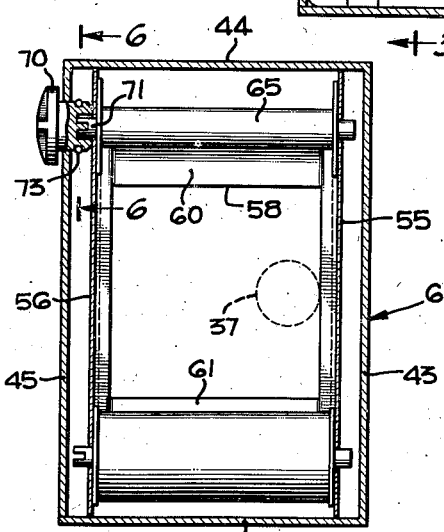
Fig. 3 is a cross-sectional view of the film roll unit taken along the line 3—3 of Fig. 2.

Referring now to the unit 6, this unit can be of the same cardboard material as that of unit 5, but with six side sections adapted to surround the unit 5, as shown in Fig. 2. That is, the wall 13 is shown with the shutter mechanism 15 and with the lens 25. The section 28 of the unit 6 is parallel with the wall 13, but spaced therefrom to provide space for the shutter 15 and for the front wire frame section 31 of the finder, which is attached to the wall 28 by friction between a cardboard strip 32 held to the wall by a staple 33. The ends of the frame 31 are turned upwardly, as shown at 34, to provide a stop for the frame when pulled upwardly, as shown in Fig. 1. The wall 28 has therein a light opening 29 to pass light to lens 25.

The wall 36 of the unit 6 is parallel with wall 18 of unit 5, but spaced therefrom, and has therein a red window opening 37, in which a red gelatine window 38 may be inserted and attached by tape or other suitable means. To provide the eyepiece of the finder, a flat apertured member 48 is attached by tape or a staple to the outside of wall 36, over which a paper or imitation leather covering may be wrapped and attached. The eyepiece is a flat strip having lower extending members 49 in the same plane as the member 48, to provide a stopping position for the eyepiece. The eyepiece 48 also has an edge portion 50 bent at right angles toward the camera to prevent its going below the surface of the wall 44 when not in use. The portion 50 is humped in the center to facilitate its location and raising.

The bottom wall of the camera is formed by section 40, which has the coin slot 41 therein. The wall 43 of the unit 6 is in contact with the side section of unit 5 having the butt joint 12 therein, while the section 44 is the top side, and section 45 is the side section, the section 45 having the slot 47 for the lever 16 of the shutter 15 and an opening 46 for the spool knob 70. Thus, the sides 40 and 44 close the ends of unit 5, and the sides 43 and 45 are in contact with side 19 and the side opposite thereto of unit 5, so that the contacting sides may be glued or stapled together to form an unusually sturdy and strong structure.

To place a roll of film in the camera, a film holder unit, such as shown in Fig. 7, is employed, wherein channel types of end members 55 and 56 are joined together by an aperture plate 57 having an aperture 58 therein, and curved end light shields 60 and 61. The curved ends 60 and 61 are sunk below the ends of the plate 57 to eliminate contact with the emulsion surface of the film. The ends of the supply spool are mounted in the openings 63 and 64 simply by spreading the members 55 and 56 apart, and the end of the backing paper of the film then attached to the empty spool 65 in the upper reel holes, similar to holes 63 and 64. The unit is then inserted in the space between the wall 18 and the wall 36, and, since the dimension from the aperture plate 57 to the edges of the ends 69 is a trifle greater than the distance between the walls 18 and 36, the resiliency of the ends 69 will cause a friction, which will not only hold the unit in position, but will hold the aperture plate 57 tightly against the wall 36 and maintain the film flat in the focal plane during photographing. After the unit is inserted in the camera box, the film advancing button 70 is attached to the slotted end 71 of the spindle 65 simply by pressing the button thereon.

In Fig. 6, it will be noted that a resilient wire hairpin 73 is positioned in a circular notch in the shaft of button 70, the ends of the hairpin passing through slots 66 and 67 in the member 55. In this manner, the button 70 is held in position when pressed on the end 71 until it is desired to remove it, which may be done simply by exerting sufficient pulling force to spread the wires. The resiliency of the wire hairpin also exerts pressure on the end of the film roll to keep the film from unwinding when not being wound on the spool.

After the camera is constructed, paper or imitation leather may be glued thereon to all sides, the covering material having the necessary openings to provide an entrance for the light and an exit of the other necessary elements, such as the lever 16 and the winding button 70, the frame 31 and eyepiece 48.

A camera is thus provided, wherein the film is held fixed in the proper focal plane, a money depository is provided, the camera is light in weight, but with sufficient strength by its form of construction to stand shipment through the mails without damage. All the essential elements are provided for taking good pictures. After the film has been exposed, it is only necessary for the user to insert the necessary money in the pocket 17 and place the box in the mails. A mailing tag may be placed on the outside of the camera cover, or mailing instructions, as illustrated at 75 in Fig. 4.

We claim:

1. A combination camera and money mailing container comprising an inner unit with four walls at right angles and open ends, an outer unit having six walls, two walls of each unit being in contact and attached to each other, two other walls of said outer unit being parallel from the other two walls of said inner unit, but spaced therefrom, and the last two walls of said outer unit closing the ends of said inner unit, and a money container attached to one of the walls of said inner unit which is attached to one of the walls of the outer unit, access thereto being provided by an opening in the wall of said outer unit at right angles to the wall of said outer unit to which the said wall of the inner unit is attached, said container having a resilient flap covering said opening to prevent light from entering said camera and the contents of said container from leaving said container.

2. A combination camera and money container in accordance with claim 1, in which a film roll holder is positioned between two of the spaced walls of said units, said holder having an aperture plate for holding a film flat against one of said walls of said outer unit.

3. A combination camera and money container in accordance with claim 1, in which an intermittent light shutter is positioned between two of the spaced walls of said units and a film roll holder is positioned between the other two spaced walls of said units.

4. A combination camera and money mailing container, comprising a rigid rectangular walled box unit of sufficient strength to retain its shape during transmittal through the mails, a camera lens and shutter mounted in a wall of said box, a film holding unit positioned in said box unit and adjacent a wall thereof opposite said lens and shutter mounting wall, compartment forming means within said box unit, a wall of said unit joining said first two mentioned walls forming a wall of said compartment and having a money insertion slot therein, and a light excluding flap normally closing said slot, said flap and the walls of said compartment excluding light from said film holding unit when said slot is opened and said flap moved to place money in said compartment.

ERIC H. HEYER.
EDWIN ELSTON.

REFERENCES CITED

The following references are of record in the file of this patent:

UNITED STATES PATENTS

| Number | Name | Date |
|---|---|---|
| 695,639 | Goerz | Mar. 18, 1902 |
| 1,191,066 | Cramer | July 11, 1916 |
| 1,222,310 | Lichtman | Apr. 10, 1917 |
| 1,656,852 | Aspis | Jan. 17, 1928 |
| 1,701,315 | Sterick | Feb. 5, 1929 |
| 1,883,511 | Bornmann | Oct. 18, 1932 |